United States Patent
Crowe

(10) Patent No.: US 12,365,381 B1
(45) Date of Patent: Jul. 22, 2025

(54) BRACKET SYSTEM FOR A STEERING SHAFT OF A ZERO-TURN MOWER

(71) Applicant: Greater Zero, LLC, Calhoun, GA (US)

(72) Inventor: Benjamin Crowe, Adairsville, GA (US)

(73) Assignee: Greater Zero, LLC, Calhoun, GA (US)

( * ) Notice: Subject to any disclaimer, the term of this patent is extended or adjusted under 35 U.S.C. 154(b) by 0 days.

(21) Appl. No.: 18/815,290

(22) Filed: Aug. 26, 2024

(51) Int. Cl.
*A01D 34/82* (2006.01)
*B62D 1/12* (2006.01)

(52) U.S. Cl.
CPC .............. *B62D 1/12* (2013.01); *A01D 34/824* (2013.01)

(58) Field of Classification Search
CPC . B62D 1/12; B62D 1/14; B62D 1/184; B62D 1/185; A01D 33/00; A01D 33/824; A01D 2034/907
See application file for complete search history.

(56) References Cited

U.S. PATENT DOCUMENTS

| | | |
|---|---|---|
| 7,426,976 B2 | 9/2008 | Edlin |
| 2008/0178568 A1* | 7/2008 | Edlin ................... A01D 34/64 56/10.8 |
| 2022/0169299 A1* | 6/2022 | Scott .................. A01D 34/824 |

FOREIGN PATENT DOCUMENTS

IN 201911050258 A 6/2021

OTHER PUBLICATIONS

Brand: BGTLGIO; Title:"Antenna Mast Clamp with U-Bolt Assembly, Antenna Pole Mount Bracket for Outside Home Antenna Pole Holder with ¾" Hole Link:https://www.amazon.in/BGTLGIO-TXGJ-001-Antenna-Mount-CLAMP/dp/B0CCYBQ3Q7?th=1.
Brand: MISUMI; Title:Offset Brackets Link:https://us.misumi-ec.com/vona2/detail/110302280110/?Tab=preview&curSearch=%7B%22field%22%3A%22%40search%22%2C%22seriesCode%22%3A%2211030228 0110%22%2C%22innerCode%22%3A%22%22%2C%22sort%22%3A1%2C%22specSortFlag%22%3A0%2C%22allSpecFlag%22%3A0%2C%22page%22%3A1%2C%22pageSize%22%3A%2260%22%7D.
Brand:IYN Stands; Title:"Pole Brackets" Link:https://iynstands.com/products/pole-brackets.
Brand:Ideal Tridon; Title:Clamp Mounting Brackets; For Use With: 3/4" Banding; Inside Diameter (Decimal Inch): 0.7500; Height/Thickness (Inch): 0.070; Width: 1-1/2; Length (Inch): 1.82; Bolt Hole Recess Diameter (Inch): 0.26; Bolt Size: 5/16".

* cited by examiner

*Primary Examiner* — Jason D Shanske
*Assistant Examiner* — Daniel M. Keck
(74) *Attorney, Agent, or Firm* — Briggs IP; Jeremy A. Briggs

(57) ABSTRACT

A bracket system including a bottom bracket portion and a top bracket portion is disclosed. The bottom bracket portion may include a bottom arc-shaped member, and the top bracket portion may include a top arc-shaped member. The top bracket portion may be configured to attach with the bottom bracket portion via one or more fasteners. Further, the top arc-shaped member may include an L-shaped bracket member disposed at a top arc-shaped member's center portion. The top arc-shaped member may be configured to attach with an external elongated shaft via the L-shaped bracket member.

20 Claims, 6 Drawing Sheets

BRACKET SYSTEM FOR A STEERING SHAFT OF A ZERO-TURN MOWER

TECHNICAL FIELD

The present disclosure relates to a bracket system for a steering shaft of a zero-turn mower, and more specifically to a bracket system configured to attach a steering shaft to mower handles with varying gaps between them.

BACKGROUND

Zero-turn mowers include handles that are used to maneuver the direction of mower movement. For example, a zero-turn mower typically includes two handles facing each other, and the user may move the mower forward, reverse or turn left/right by pushing both the handles forward, reverse or pushing one handle opposite to the other.

Many-a-times, users with disabilities or users with one hand occupied are not able to efficiently push and/or pull the two mower handles simultaneously. In such circumstances, the users are known to use an elongated steering shaft that is attached between the two mower handles, which enables the user to maneuver the mower movement via the steering shaft with one hand.

It is known that some mowers have different types of handles. For example, some mowers have handles that are positioned apart from each other at a greater distance than the handles of other mowers. This causes inconvenience to the users as the same steering shaft cannot be attached to mowers with different handle types, or the users are required to use different attachment mechanisms to attach the steering shaft with handles of different types.

Thus, there is a need for a system that enables a user to easily attach a steering shaft to different types of mower handles.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
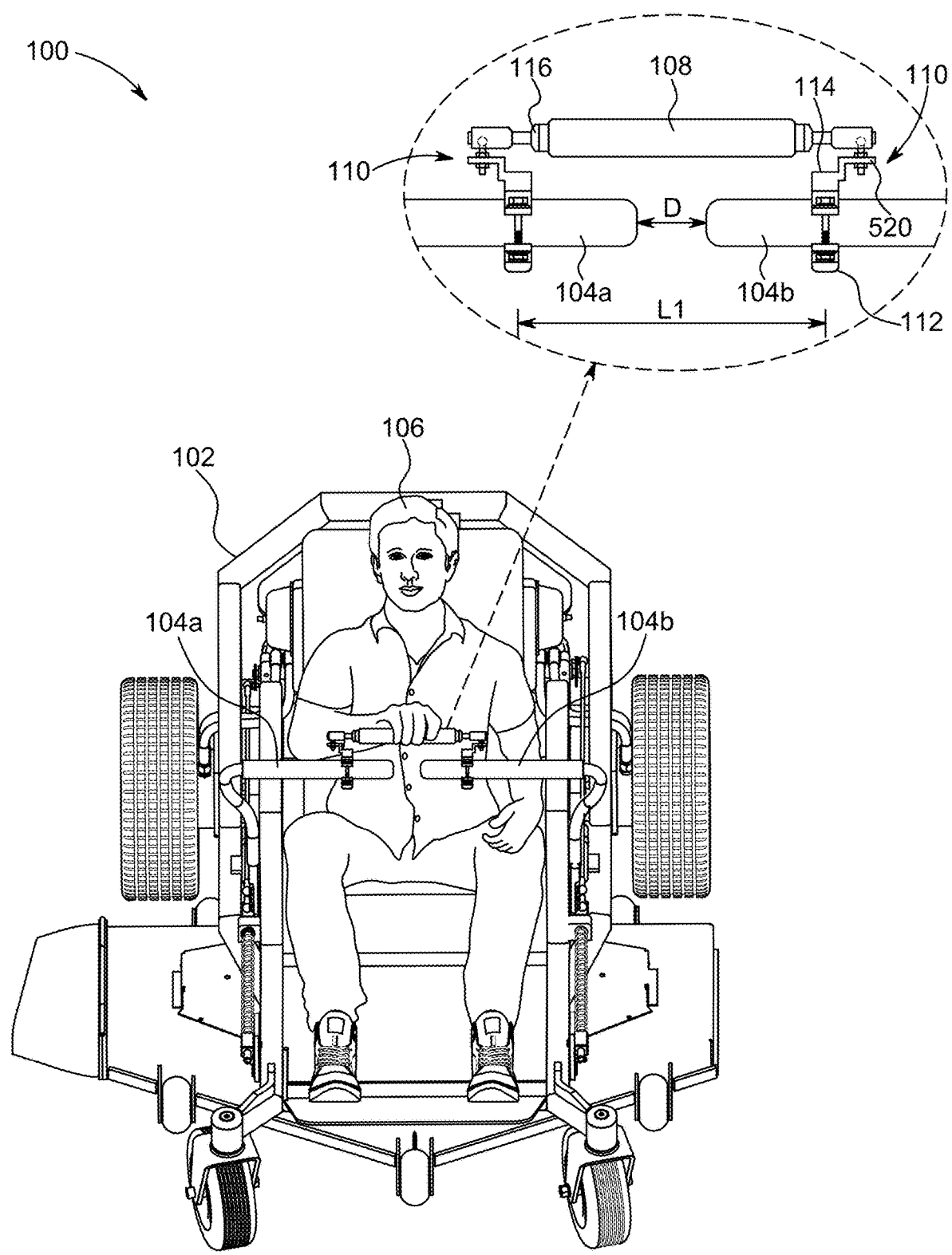
FIG. 1 depicts an environment in which techniques and structures for providing the systems and methods disclosed herein may be implemented.

The present disclosure is directed to a bracket system that may enable an elongated steering shaft ("shaft") to be connected to different types of mower handles. Specifically, the bracket system may enable the shaft to be connected to mower handles that are disposed at different distances from each other or that may have different gaps between them. The bracket system may include a top bracket portion and a bottom bracket portion that may be configured to be attached with each other via one or more fasteners (which may be, for example, nuts, screws, etc.). The top and bottom bracket portions may enclose the mower handle when the top and bottom bracket portions are attached with each other.

The top bracket portion may include a top arc-shaped member, and the bottom bracket portion may include a bottom arc-shaped member. Interior surfaces of the top and bottom arc-shaped members may contact a mower handle's exterior periphery/surface when the top and bottom bracket portions are attached with each other. In some aspects, the top arc-shaped member may include a first L-shaped bracket member and a second L-shaped bracket member that may be connected with each other to form a double L-shaped bracket member (which may have a stair-like shape). The double L-shaped bracket member may be located/disposed at a center portion of a top arc-shaped member's exterior surface. In an exemplary aspect, a longitudinal axis of the double L-shaped bracket member may be perpendicular to a longitudinal axis of the top arc-shaped member.

In some aspects, the double L-shaped bracket member may include a ball connector and the shaft may include a socket coupling. The shaft may be connected to the double L-shaped bracket member (and hence the bracket system) via the ball connector and the socket coupling.

In some aspects, each mower handle may be attached to one bracket system, which in turn may be attached to a shaft's edge (e.g., a left edge or a right edge). Consequently, to attach the shaft to a mower with two handles, a user may attach the shaft's left edge/portion to a first bracket system, which may be attached to a left mower handle. Further, the user may attached the shaft's right edge/portion to a second bracket system, which may be attached to a right mower handle.

To attach the shaft to a mower having a greater gap/distance between the two mower handles, the user may attach the first and second bracket systems in an "inverted" configuration, in which the two double L-shaped bracket members of the first and second bracket systems may face towards each other. On the other hand, to attach the shaft to a mower having a lesser gap/distance between the two mower handles, the user may attach the first and second bracket systems in an "extended" configuration, in which the two double L-shaped bracket members of the first and second bracket systems may face away from each other. In this manner, the same shaft and bracket system may be used to connect the shaft with mower handles having different gaps/distances between them.

In additional aspects, the interior surfaces of the top and bottom arc-shaped members may include one or more gripping ribs that enable the top and bottom arc-shaped members to securely "grip" the handle's surface and prevent slippage when the top and bottom bracket portions are attached with each other. In an exemplary aspect, each gripping rib may have a triangular cross-section with a rounded edge that touches the handle's surface when the top and bottom bracket portions are attached with each other.

The present disclosure discloses a bracket system that may enable a user to conveniently attach an elongated steering shaft to mower handles having different gaps/distances between them. By switching the bracket system's orientation or configuration, the user can conveniently attach the steering shaft to mower handles that have a greater gap between them as compared to other mower handles with shorter gaps. Furthermore, the gripping ribs present in the interior surfaces of the top and bottom arc-shaped members ensure that the bracket system does not slip on the mower handle, when the bracket system is attached to the handle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. FIG. 1 will be described in conjunction with FIGS. 2, 3, 4, 5, and 6.

The environment 100 may include a lever controlled vehicle 102, which may be, for example, a zero-turn mower. Hereinafter, the lever controlled vehicle 102 is referred to as mower 102 in the present disclosure. The mower 102 may include handles 104a, 104b (collectively referred to as handles 104) that may be used by a user 106 (who may be sitting on a mower chair, as shown in FIG. 1) to maneuver the mower movement. For example, the user 106 may push both the handles 104 forward away from the user's body when the user 106 desires the mower 102 to move forward. Similarly, the user 106 may pull both the handles 104 backward towards the user's body when the user 106 desires the mower 102 to move in reverse. Further, the user 106 may push one handle forward and/or pull one handle backward when the user 106 desires the mower 102 to turn left or right.

The mower 102 may be a conventional zero-turn mower, and hence the mower's structure, components and their functions are not described in detail herein for the sake of simplicity and conciseness.

The environment 100 may further include an elongated steering shaft 108 (or shaft 108) and bracket systems 110. The shaft 108 may be attached to the handles 104 via the bracket system 110. Specifically, a shaft's left end/portion may be attached to the left handle 104a via a left bracket system 110, and a shaft's right end/portion may be attached to the right handle 104b via a right bracket system 110 (which may be the same in structure/design/dimensions as the left bracket system 110).

Since the shaft 108 is attached to the handles 104, the shaft 108 may enable the user 106 to move the handles 104 forward, backward together or independently (and hence maneuver the mower movement) by using a single hand, as shown in FIG. 1. Specifically, the shaft 108 enables users with disabilities, or users with one hand occupied, or users who desire to use only hand, to conveniently maneuver the mower movement without having to push/pull the handles 104 directly. When the user 106 desires to move the mower 102 forward, the user 106 may push the shaft 108 away from the user's body, which may cause the attached handles 104 to also move forward, thereby causing the mower's forward movement. Similarly, when the user 106 desires to move the mower 102 in reverse, the user 106 may pull the shaft 108 towards the user's body, which may cause the attached handles 104 to move backward, thereby causing the mower's reverse movement. Furthermore, when the user 106 desires the mower 102 to turn left or right, the user 106 may twist/turn the shaft 108 clockwise or counter-clockwise, which may cause one handle to move forward and the other handle to move backwards, thereby turning the mower 102 left or right.

In an exemplary aspect, the shaft 108 may be cylindrical in shape. Structural details of the shaft 108 are contemplated in U.S. Pat. No. 11,285,986, which is incorporated in its entirety here in the present disclosure by reference.

Figure 2:
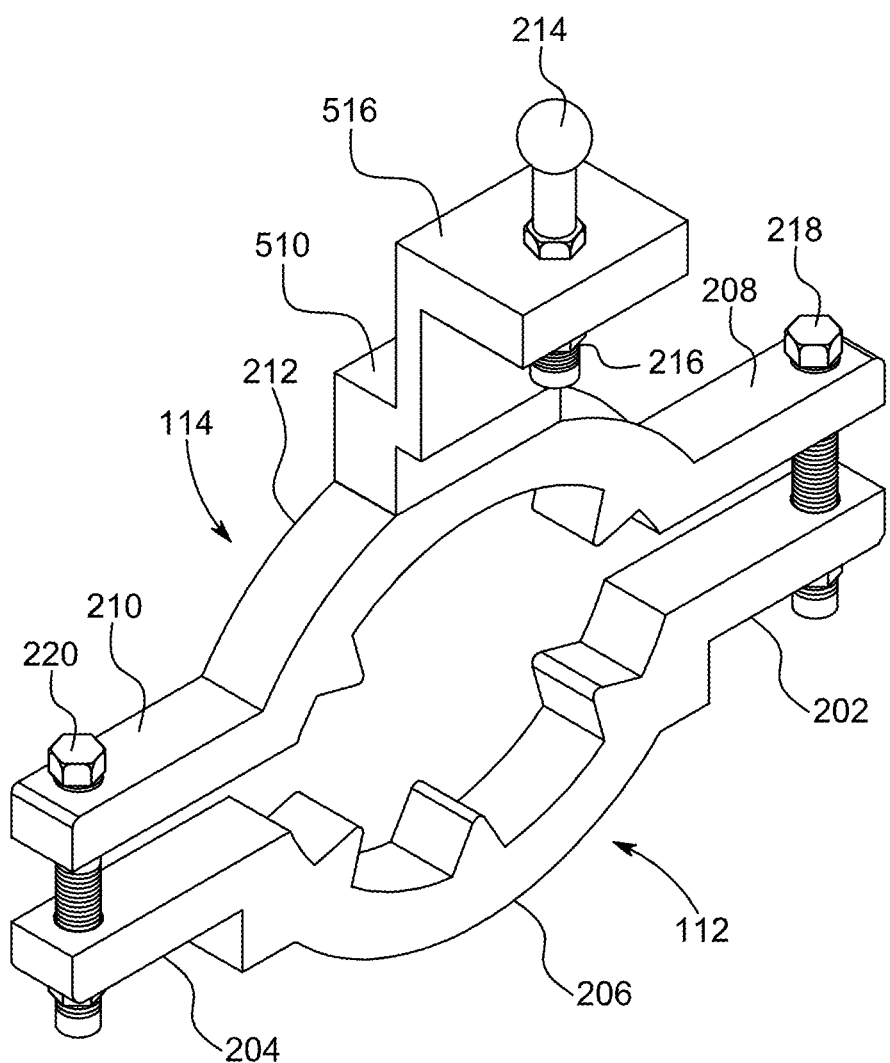
FIG. 2 depicts a view of an example bracket system in accordance with the present disclosure.

Each bracket system 110 may include a bracket bottom portion 112 and a bracket top portion 114, which may be made of metal, e.g., aluminum. The bracket bottom portion 112 and the bracket top portion 114 may be configured to be attached with each other via one or more fasteners (which may be nuts, screws, etc.), as shown in FIG. 2. The bracket bottom and top portions 112, 114 may enclose the handle 104 (specifically, the handle's periphery or exterior surface) in their respective interior surfaces when the bracket bottom and top portions 112, 114 are attached with each other, as shown in FIG. 1.

The bracket bottom portion 112 may include a first bottom arm 202, a second bottom arm 204, and a bottom arc-shaped member 206. The first and second bottom arms 202, 204 may be rectangular or square plates having same dimensions (e.g., same thicknesses, edge dimensions, etc.). The bottom arc-shaped member 206 may be connected between the first bottom arm 202 and the second bottom arm 204. The first bottom arm 202, the second bottom arm 204 and the bottom arc-shaped member 206 may form an integrated structure of the bracket bottom portion 112. In an exemplary aspect, the bottom arc-shaped member 206 may be C-shaped (e.g., be in a shape of a C-clamp).

Figure 3:
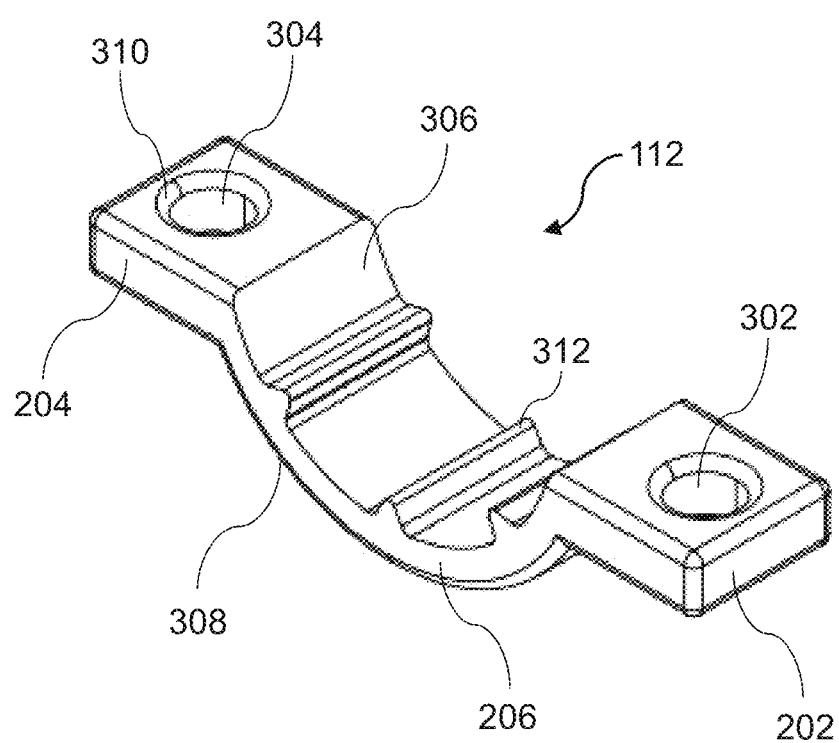
FIG. 3 depicts an isometric view of a bottom bracket portion of a bracket system in accordance with the present disclosure.
Figure 4:
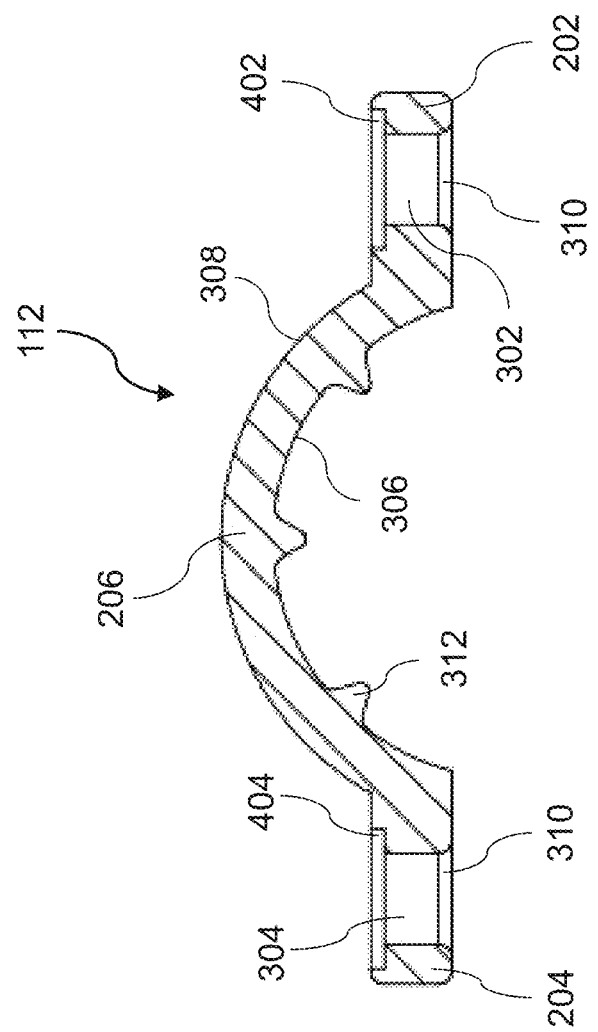
FIG. 4 depicts a cross-sectional view of the bottom bracket portion of FIG. 3 in accordance with the present disclosure.

The first bottom arm 202 may include a first through-hole 302, and the second bottom arm 204 may include a second through-hole 304, as shown in FIGS. 3 and 4. The bracket bottom portion 112 may further include an interior surface 306 and an exterior surface 308 that may be disposed opposite to the interior surface 306. In an exemplary aspect, each through-hole 302, 304 may include a chamfered edge 310 at the interior surface 306 and an indented edge at the exterior surface 308. For example, the first through-hole 302 may include a first indented edge 402, and the second through-hole 304 may include a second indented edge 404. In some aspects, the first and second indented edges 402, 404 may be circular cavities around the peripheries of the first and second through-holes 302, 304, which may be configured to secure washers (e.g., a first washer and a second washer respectively).

In some aspects, the bracket bottom portion 112 may further include one or more first gripping ribs 312 that may be present/disposed at the interior surface 306. The first gripping ribs 312 may be configured to provide a secure gripping of the bracket bottom portion 112 with the handle 104 and prevent any slippage, when the bracket bottom portion 112 encloses the handle 104 (as described above). In the exemplary aspect depicted in FIGS. 3 and 4, the bracket bottom portion 112 is shown to include three first gripping ribs 312; however, the present disclosure is not limited to such an aspect. The bracket bottom portion 112 may include more or less than three gripping ribs, without departing from the present disclosure scope. Furthermore, in an exemplary aspect, each first gripping rib 312 may have a triangular cross-section with a rounded top edge (the edge that touches the handle 104 when the bracket bottom portion 112 encloses the handle 104). The triangular cross-section efficiently prevents slippage when the bracket bottom portion 112 encloses the handle 104, and the rounded top edge mitigates damage to the handle's surface when the interior surface 306 touches the handle 104.

Similar to the bracket bottom portion 112, the bracket top portion 114 may include a first top arm 208, a second top arm 210, and a top arc-shaped member 212. The first and second top arms 208, 210 may be similar to the first and second bottom arms 202, 204. The top arc-shaped member 212 may be connected between the first top arm 208 and the second top arm 210. The first top arm 208, the second top arm 210 and the top arc-shaped member 212 may form an integrated structure of the bracket top portion 114. In an exemplary aspect, the top arc-shaped member 212 may be C-shaped (e.g., be in a shape of a C-clamp). Further, in some aspects, the top arc-shaped member's dimensions (e.g., the arc length, diameter, etc.) may be the same as the bottom arc-shaped member's dimensions. In other aspects, one or more top arc-shaped member's dimensions may be different from the bottom arc-shaped member's dimensions.

Figure 5:
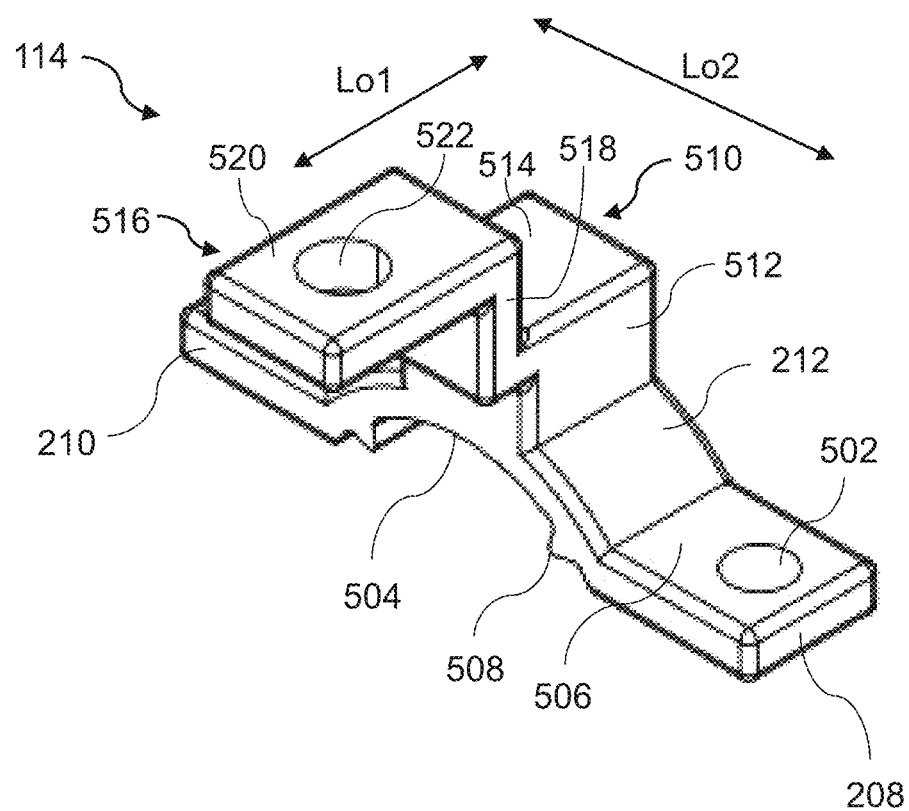
FIG. 5 depicts an isometric view of a top bracket portion of a bracket system in accordance with the present disclosure.

The first top arm 208 may include a third through-hole 502 (as shown in FIG. 5) and the second top arm 210 may include a fourth through-hole (not shown). The third and fourth through holes may be similar to the first and second through-holes 302, 304. The bracket top portion 114 may further include an interior surface 504 and an exterior surface 506 that may be disposed opposite to the interior surface 504. In some aspects, the bracket top portion 114 may further include one or more second gripping ribs 508 that may be present/disposed at the interior surface 504. The function and structure of the second gripping ribs 508 may be the same as the function and structure of the first gripping ribs 312. Further, a count of the second gripping ribs 508 on the top arc-shaped member 212 may be the same as or different from a count of the first gripping ribs 312 on the bottom arc-shaped member 206. For example, as shown in FIG. 5, the top arc-shaped member 212 may have two second gripping ribs 508, although the present disclosure is not limited to this count.

In some aspects, the top arc-shaped member 212 may include a first L-shaped bracket member 510 that may be disposed at a top arc-shaped member's center portion. The first L-shaped bracket member 510 may include a first portion 512 and a second portion 514. The first portion 512 may be connected in a perpendicular alignment with the second portion 514, to form the first L-shaped bracket member 510. The first portion 512 may be connected to the top arc-shaped member's center portion, as shown in FIG. 5. Specifically, the first portion 512 (and hence the first L-shaped bracket member 510) may be connected to the exterior surface 506 of the top arc-shaped member's center portion. In some aspects, a longitudinal axis "Lo1" of the first L-shaped bracket member 510 may be perpendicular to a longitudinal axis "Lo2" of the top arc-shaped member 212.

The top arc-shaped member 212 may further include a second L-shaped bracket member 516 that may be connected with the first L-shaped bracket member 510 to form a double L-shaped bracket member (which have a "dog-leg" or "stair" shape), as shown in FIG. 5. A second L-shaped bracket member's longitudinal axis may be aligned with the longitudinal axis "Lo1". The second L-shaped bracket member 516 may include a third portion 518 and a fourth portion 520. The third portion 518 may be connected in a perpendicular alignment with the fourth portion 520, to form the second L-shaped bracket member 516. Further, the third portion 518 may be parallel to the first portion 512, and the fourth portion 520 may be parallel to the second portion 514. The third portion 518 may be connected with the second portion 514 to form the double L-shaped bracket member, as shown in FIG. 5. In some aspects, the longitudinal axis "Lo1" of the second L-shaped bracket member 516 (and hence the longitudinal axis "Lo1" of the double L-shaped bracket member) may be perpendicular to the longitudinal axis "Lo2".

In an exemplary aspect, the first top arm 208, the second top arm 210, the top arc-shaped member 212, the first L-shaped bracket member 510 and the second L-shaped bracket member 516 may form an integrated structure of the bracket top portion 114.

In further aspects, the fourth portion 520 may include a fifth through-hole 522, which may be similar to the first, second, third, fourth through-holes 302, 304, 502 described above. In an exemplary aspect, the bracket system 110 may further include a ball connector 214 (as shown in FIG. 2) that may be attached to the fourth portion 520 via the fifth through-hole 522 and a first fastener 216 (which may include, for example, a nut and bolt).

As described above, the bracket bottom portion 112 and the bracket top portion 114 may be configured to be attached with each other via one or more fasteners. Specifically, to attach the bracket bottom portion 112 with the bracket top portion 114, the first top arm 208 may be configured to attach with the first bottom arm 202 via a second fastener 218 (as shown in FIG. 2), a first washer (not shown), the first through-hole 302 and the third through-hole 502. When the first top arm 208 is attached with the first bottom arm 202 as described above, the first top arm 208 may be disposed on top of the first bottom arm 202. Further, in this case, the first indented edge 402 may be configured to secure the first washer, so that the second fastener 218 may not get "stuck" in the first through-hole 302 when the second fastener 218 is attached via the first through-hole 302 (and can be easily removed in the future, if required).

In a similar manner, to attach the bracket bottom portion 112 with the bracket top portion 114, the second top arm 210 may be configured to attach with the second bottom arm 204 via a third fastener 220 (as shown in FIG. 2), a second washer (not shown), the second through-hole 304 and the fourth through-hole. When the second top arm 210 is attached with the second bottom arm 204 as described above, the second top arm 210 may be disposed on top of the second bottom arm 204. Further, in this case, the second indented edge 404 may be configured to secure the second washer, so that the third fastener 220 may not get "stuck" in the second through-hole 304 when the third fastener 220 is attached via the second through-hole 304 (and can be easily removed in the future, if required).

When the bracket bottom portion 112 is attached with the bracket top portion 114 as described above and the handle 104 is disposed between the bracket bottom portion 112 and the bracket top portion 114 when these portions are attached, the top arc-shaped member 212 and the bottom arc-shaped member 206 may enclose the handle 104. Specifically, in this case, the interior surfaces of the top arc-shaped member 212 and the bottom arc-shaped member 206 may enclose and contact the handle's exterior periphery/surface, to efficiently secure the handle 104 between the bracket bottom portion 112 and the bracket top portion 114.

The bracket system 110 may be further configured to attach with the shaft 108, as shown in FIG. 1. In an exemplary aspect, the shaft's left and right edges/portions may include a socket coupling (not shown) that may engage with the ball connector 214 to attach the shaft 108 with the ball connector 214, and hence with the bracket system 110. In some aspects, the user 106 may "push" the shaft's socket coupling onto the ball connector 214 to connect/attach the shaft 108 with the ball connector 214. In this manner, the shaft 108 may connect with the double L-shaped bracket member (specifically the fourth portion 520) via the ball connector 214 (that may be connected to the fifth through-hole 522 as described above) and the socket coupling.

The double L-shaped bracket member's shape, as described above, provides many advantages to the user 106. For example, the user 106 may attach the bracket system 110 in an "extended" configuration or in an "inverted" configuration based on the available mountable surface area on the handle 104 on which the bracket system 110 may be mounted. In the extended configuration, the double L-shaped bracket members of the two bracket systems 110 (i.e., the left and right bracket systems 110) may face away from each other. Further, in the inverted configuration, the double L-shaped bracket members of the two bracket systems 110 may face towards from each other. Depending on where the mountable surface area is on the handle 104, the user 104 may either attach the bracket system 110 in the extended configuration or the inverted configuration.

Figure 6:
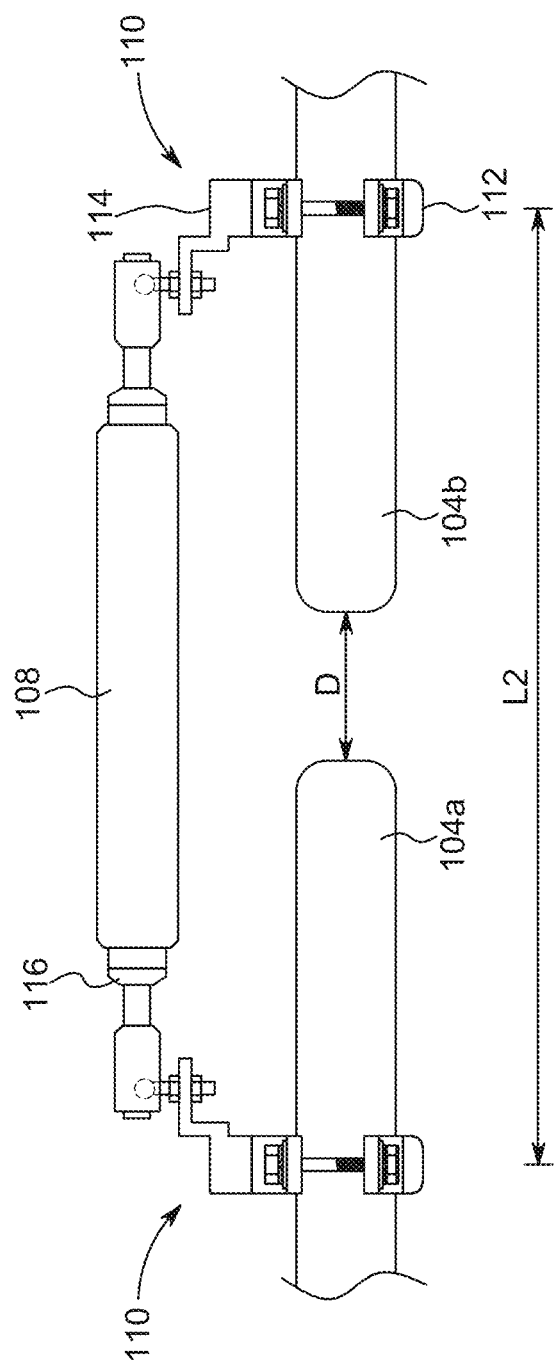
FIG. 6 depicts a view of an example elongated steering shaft connected to mower handles via a bracket system in accordance with the present disclosure.

As another example, when a gap "D" (as shown in FIG. 1) between the two handles 104 is small (e.g., less than or equal to 10 inches), the user 106 may attach the bracket system 110 in the extended configuration in which the double L-shaped bracket members of the two bracket systems 110 (i.e., the left and right bracket systems 110) may face away from each other. Specifically, in the bracket system's extended configuration, the fourth portions 520 of the two bracket systems 110 may face away from each other, as shown in FIG. 1. On the other hand, when the gap "D" (as shown in FIG. 6) between the two handles 104 is larger (e.g., greater than 10 inches), the user 106 may attach the bracket system 110 in the inverted configuration in which the double L-shaped bracket members of the two bracket systems 110 may face towards from each other. Specifically, in the bracket system's inverted configuration, the fourth portions 520 of the two bracket systems 110 may face towards from each other, as shown in FIG. 6.

A person ordinarily skilled in the art may appreciate that a length "L1" (as shown in FIG. 1, which may be less than or equal to 10 inches) between the two bracket systems 110 in the bracket system's extended configuration may be less than a length "L2" (as shown in FIG. 6, which may be greater than 10 inches, e.g., approximately 15 inches) between the two bracket systems 110 in the bracket system's inverted configuration. Since "L2" is greater than "L1", the bracket systems 110 can be easily used to attach the shaft 108 to mowers that have a larger distance/gap "D", by attaching the bracket systems 110 in the inverted configuration. Therefore, by simply reversing the direction of bracket system's attachment on the handles 104, the user 106 can use the same bracket systems 110 with mowers having different gaps between the two handles 104. A person ordinarily skilled in the art may appreciate that this advantage of reversing the direction of attachment to accommodate for different gaps between the two handles 104 is made possible by the double L-shaped bracket member's shape described above (since it provides the required "offset" to change the distance between the two bracket systems 110).

Furthermore, even if the gap "D" is less than 10 inches, the user 106 may still attach the bracket system 110 in the inverted configuration, if the available mountable surface areas on the handles 104a, 104a are at a larger distance from each other. In this manner, the user 106 may attach the bracket system 110 in the inverted configuration or the extended configuration not just based on the gap "D" between the handles 104a, 104b, but also based on where the available mountable surface area is on the handles 104a, 104b.

In an exemplary aspect, the shaft 108 may further include a telescoping mechanism 116 (which may be a spring-based telescoping mechanism) that may enable the shaft 108 to change a shaft length when, e.g., the user 106 may be turning the shaft 108 left or right. The telescoping mechanism 116 may be present on both the shaft's left and right portions, so that the shaft 108 may be easily turned in left or right directions. Structural details of the shaft 108 are contemplated in U.S. Pat. No. 11,285,986, which is incorporated in its entirety here in the present disclosure by reference.

Although the description above describes an aspect where the bracket system 110 includes the double L-shaped bracket member (i.e., both the first and second L-shaped bracket members 510, 516), the present disclosure is not limited to such an aspect. In alternative aspects, when the bracket system 110 is required to be used with a "stand-on" mower, the bracket system 110 may not include the second L-shaped bracket member 516. In this case, the bracket system 110 may include only the first L-shaped bracket member 510, which may include the ball connector 214 connected to the second portion 514. In this case also, the ball connector 214 may attach with the shaft's socket coupling to enable attachment between the first L-shaped bracket member 510 (and hence the bracket system 110) and the shaft 108.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A bracket system comprising:
    a bottom bracket portion comprising a bottom arc-shaped member; and
    a top bracket portion comprising a top arc-shaped member, wherein:
        the top bracket portion is configured to attach with the bottom bracket portion via one or more fasteners,
        the top arc-shaped member comprises a first L-shaped bracket member disposed at a top arc-shaped member's center portion, and
        the top arc-shaped member is configured to attach with an external elongated shaft via the first L-shaped bracket member.

2. The bracket system of claim 1, wherein the top arc-shaped member and the bottom arc-shaped member are configured to enclose an external handle when the top bracket portion is attached with the bottom bracket portion.

3. The bracket system of claim 1, wherein the bottom bracket portion further comprises a first bottom arm and a second bottom arm, wherein:
    the bottom arc-shaped member is connected between the first bottom arm and the second bottom arm,
    the first bottom arm comprises a first through-hole with a first indented edge, and
    the second bottom arm comprises a second through-hole with a second indented edge.

4. The bracket system of claim 3, wherein the top bracket portion further comprises a first top arm and a second top arm, wherein:
    the top arc-shaped member is connected between the first top arm and the second top arm,
    the first top arm comprises a third through-hole and the second top arm comprises a fourth through-hole,
    the first top arm is configured to attach with the first bottom arm via a first fastener, a first washer, the first through-hole and the third through-hole, and
    the second top arm is configured to attach with the second bottom arm via a second fastener, a second washer, the second through-hole and the fourth through-hole to attach the top bracket portion and the bottom bracket portion.

5. The bracket system of claim 4, wherein the first indented edge is configured to secure the first washer, and wherein the second indented edge is configured to secure the second washer.

6. The bracket system of claim 1, wherein an interior surface of the bottom arc-shaped member comprises one or more first gripping ribs, and wherein an interior surface of the top arc-shaped member comprises one or more second gripping ribs.

7. The bracket system of claim 6, wherein the first L-shaped bracket member is disposed at an exterior surface of the top arc-shaped member, and wherein the exterior surface is disposed opposite to the interior surface of the top arc-shaped member.

8. The bracket system of claim 6, wherein each gripping rib of the one or more first gripping ribs and the one or more second gripping ribs has a triangular cross-section.

9. The bracket system of claim 1, wherein the top arc-shaped member further comprises a second L-shaped bracket member, and wherein:
    the first L-shaped bracket member and the second L-shaped bracket member are connected with each other to form a double L-shaped bracket member,
    the second L-shaped bracket member comprises a fifth through-hole, and
    the double L-shaped bracket member is configured to attach with the external elongated shaft via the fifth through-hole.

10. The bracket system of claim 9 further comprising a ball connector attached to the fifth through-hole via a third fastener, wherein the external elongated shaft comprises a socket coupling, and wherein the external elongated shaft is configured to attach with the double L-shaped bracket member via the ball connector and the socket coupling.

11. The bracket system of claim 9, wherein a longitudinal axis of the double L-shaped bracket member is perpendicular to a longitudinal axis of the top arc-shaped member.

12. The bracket system of claim 1, wherein the external elongated shaft comprises a telescoping mechanism that enables the external elongated shaft to change an external elongated shaft length.

13. The bracket system of claim 12, wherein the telescoping mechanism is a spring based telescoping mechanism.

14. The bracket system of claim 1, wherein a longitudinal axis of the first L-shaped bracket member is perpendicular to a longitudinal axis of the top arc-shaped member.

15. A bracket system comprising:
    a bottom bracket portion comprising a bottom arc-shaped member; and
    a top bracket portion comprising a top arc-shaped member, wherein:
        the top bracket portion is configured to attach with the bottom bracket portion via one or more fasteners,
        the top arc-shaped member comprises a first L-shaped bracket member and a second L-shaped bracket member connected with each other to form a double L-shaped bracket member,
        the double L-shaped bracket member is disposed at a top arc-shaped member's center portion, and the top arc-shaped member is configured to attach with an external elongated shaft via the double L-shaped bracket member.

16. The bracket system of claim 15, wherein a longitudinal axis of the double L-shaped bracket member is perpendicular to a longitudinal axis of the top arc-shaped member.

17. The bracket system of claim 15, wherein an interior surface of the bottom arc-shaped member comprises one or more first gripping ribs, and wherein an interior surface of the top arc-shaped member comprises one or more second gripping ribs.

18. The bracket system of claim 17, wherein each gripping rib of the one or more first gripping ribs and the one or more second gripping ribs has a triangular cross-section.

19. The bracket system of claim 15, wherein the top arc-shaped member and the bottom arc-shaped member are configured to enclose an external handle when the top bracket portion is attached with the bottom bracket portion.

20. A system comprising:
an elongated shaft comprising a telescoping mechanism that enables the elongated shaft to change an external elongated shaft length; and
a bracket system comprising:
    a bottom bracket portion comprising a bottom arc-shaped member; and
    a top bracket portion comprising a top arc-shaped member, wherein:
        the top bracket portion is configured to attach with the bottom bracket portion via one or more fasteners,
        the top arc-shaped member comprises a first L-shaped bracket member and a second L-shaped bracket member connected with each other to form a double L-shaped bracket member,
        the double L-shaped bracket member is disposed at a top arc-shaped member's center portion, and
        the top arc-shaped member is configured to attach with the elongated shaft via the double L-shaped bracket member.

* * * * *